United States Patent
Jin et al.

(10) Patent No.: US 12,311,409 B2
(45) Date of Patent: May 27, 2025

(54) SILICON WAFER SORTING MECHANISM AND SORTING MACHINE EQUIPPED WITH SORTING MECHANISM

(71) Applicant: TCL ZHONGHUAN RENEWABLE ENERGY TECHNOLOGY CO., LTD., Tianjin (CN)

(72) Inventors: Lihui Jin, Tianjin (CN); Hua Yang, Tianjin (CN); Zhigao Ren, Tianjin (CN); Huan Wang, Tianjin (CN); Chuanling Ai, Tianjin (CN); Dawei Wang, Tianjin (CN); Zhijun Wu, Tianjin (CN); Hongxia Cen, Tianjin (CN); Chen Wei, Tianjin (CN)

(73) Assignee: TCL ZHONGHUAN RENEWABLE ENERGY TECHNOLOGY CO., LTD., Tianjin (CN)

( * ) Notice: Subject to any disclaimer, the term of this patent is extended or adjusted under 35 U.S.C. 154(b) by 0 days.

(21) Appl. No.: 18/548,085

(22) PCT Filed: Jul. 18, 2023

(86) PCT No.: PCT/CN2023/107812
§ 371 (c)(1),
(2) Date: Aug. 26, 2023

(87) PCT Pub. No.: WO2023/241729
PCT Pub. Date: Dec. 21, 2023

(65) Prior Publication Data
US 2025/0018434 A1    Jan. 16, 2025

(30) Foreign Application Priority Data
Jun. 14, 2022    (CN) .......................... 202221479256.1

(51) Int. Cl.
B07C 5/36    (2006.01)

(52) U.S. Cl.
CPC ...................................... B07C 5/36 (2013.01)

(58) Field of Classification Search
CPC .......... B07C 5/36; B07C 6/00; B07C 2501/00
See application file for complete search history.

(56) References Cited

U.S. PATENT DOCUMENTS

2010/0282647 A1*  11/2010  Miller ..................... B07B 11/06
                                                                       209/129

FOREIGN PATENT DOCUMENTS

| CN | 102873035 A | 1/2013 |
| CN | 111430505 A | 7/2020 |

(Continued)

OTHER PUBLICATIONS

International Search Report in International application No. PCT/CN2023/107812, mailed on Oct. 13, 2023.

(Continued)

*Primary Examiner* — Jacob S. Scott
*Assistant Examiner* — Miraj T. Patel
(74) *Attorney, Agent, or Firm* — PV IP PC; Wei Te Chung

(57) ABSTRACT

A silicon wafer sorting mechanism includes a wafer distribution unit, a sorting unit, and a transmission unit disposed sequentially. The sorting unit includes a sorting table with one terminal hinged to the wafer distribution unit. The sorting table rotates and tilts with a point where the sorting table is hinged to the wafer distribution unit. The sorting table and the transmission unit are arranged up and down in dislocation or the sorting table is placed horizontally against the transmission unit, thereby forming two transmission lines in different directions to sort silicon wafers of different types.

14 Claims, 2 Drawing Sheets

(56) References Cited

FOREIGN PATENT DOCUMENTS

| | | |
|---|---|---|
| CN | 213495026 U | 6/2021 |
| CN | 213558494 U | 6/2021 |
| CN | 217830844 U | 11/2022 |
| JP | S5932146 A | 2/1984 |
| KR | 20160020199 A | 2/2016 |

OTHER PUBLICATIONS

Written Opinion of the International Search Authority in International application No. PCT/CN2023/107812, mailed on Oct. 13, 2023.

* cited by examiner

SILICON WAFER SORTING MECHANISM AND SORTING MACHINE EQUIPPED WITH SORTING MECHANISM

CROSS-REFERENCE TO RELATED APPLICATION

This application claims priority to and the benefit of Chinese Patent Application No. 202221479256.1, filed in the China National Intellectual Property Administration on Jun. 14, 2022, the disclosure of which is hereby incorporated by reference in its entirety.

FIELD OF THE DISCLOSURE

The present disclosure relates to the technical field of silicon wafer sorting equipment, and more particularly, to a silicon wafer sorting mechanism and a sorting machine equipped with the sorting mechanism.

BACKGROUND

Sorting in washing machine is an important step after degumming and cleaning of silicon wafers. Different routes are used to sort good and defective products, and then these products enter different collection bins for collection. For existing cleaning machines, the existing structures are limited. In the existing sorting processes, when an abnormality occurs, an abnormal silicon wafer is directly pushed up and transported horizontally to the outside of the conveyor belt. However, this structure requires a large width of the cleaning machine, and additional auxiliary structures are required to receive the silicon wafers during subsequent reception, resulting in a complex overall structure. Moreover, the transmission mechanism provided with the pushing-up component needs to be seamlessly connected with the transmission mechanisms fixedly arranged at the front and rear when it falls. Frequent contact will easily cause the front and rear transmission mechanisms to vibrate, which in turn will cause the position of the front and rear transmission mechanisms to change. Thus, it is very easy to cause silicon wafers to be damaged or broken because the silicon wafers get stuck at the contact positions, which seriously affects the quality of silicon wafer sorting.

SUMMARY

The present disclosure provides a silicon wafer sorting mechanism and a sorting machine equipped with the sorting mechanism, which solves the technical problem of poor sorting quality caused by a complex sorting structure and easy vibration in the prior arts.

According to a first embodiment of the present disclosure, a silicon wafer sorting mechanism includes a wafer distribution unit, a sorting unit, and a transmission unit disposed sequentially. The sorting unit includes a sorting table with one terminal hinged to the wafer distribution unit. The sorting table rotates and tilts with a point where the sorting table is hinged to the wafer distribution unit. The sorting table and the transmission unit are arranged up and down in dislocation or the sorting table is placed horizontally against the transmission unit, thereby forming two transmission lines in different directions to sort silicon wafers of different types.

Furthermore, the sorting unit further comprises an ejector for controlling a rotary swing of the sorting table. One terminal of the ejector is hinged to a bottom surface of a terminal of the sorting table that is near the transmission unit, and the other terminal of the ejector is pivoted to the inside of the wafer distribution unit. The ejector is shrunk or elongated to drive the sorting table rotate downward or reverse to a horizontal position.

Furthermore, the wafer distribution unit includes a wafer distribution strip disposed in a transmission direction, and wafer distribution frame bodies, structured as a cuboid structure having a cavity and relatively disposed on two sides of the wafer distribution strip. The wafer distribution strip is fixed to the wafer distribution frame bodies by rotation axes.

Furthermore, a track arranged below the wafer distribution frame bodies and along the length direction of the wafer distribution frame bodies, and the wafer distribution frame bodies slide synchronously along the track.

Furthermore, the sorting table includes a guide plate and a sorting strip disposed on two sides of the guide plate. Terminals of the guide plate and the sorting strip are hinged to the rotation axis that is disposed near one side of the sorting table. The other terminal of the guide plate is suspended. The other terminal of the sorting strip is connected to a terminal of the guide plate that is suspended by a short shaft.

Furthermore, the transmission unit comprises transmission frame bodies that are disposed fixedly and a transmission strip for transmitting good silicon wafers. The transmission strip and the wafer distribution strip are configured at the same height. The transmission frame bodies are disposed on two sides of the transmission strip and coaxially arranged with the wafer distribution frame bodies that are disposed oppositely.

Furthermore, the transmission frame bodies are constructed as a housing structure.

Furthermore, the transmission unit further includes adjustable components for adjusting a horizontal distance between the transmission strip and the wafer distribution strip, and each transmission frame body is equipped with one adjustable component. Two terminals of a piston of the adjustable component are respectively disposed on the wafer distribution frame body and the transmission frame body that are on the same side.

Furthermore, a collection slot for collecting silicon wafers is disposed, and a portion of the collection slot is located directly below the transmission strip.

The silicon wafer sorting mechanism of the present disclosure only adopts a cantilevered sorting table to form two transmission lines, which tilt downward and are disposed, in different directions on the original space length. When the sorting table rotates downward, abnormal silicon wafers can be smoothly sent into the storage slot. When the sorting table rotates counterclockwise, the front wafer distribution unit that disposed to drive the sliding action is seamlessly connected to the rear transfer unit, which continuously provides a smooth transmission line for the good silicon wafers. The whole matching mechanism can quickly and accurately sort good and defective products and makes the defective products go down for collection without setting up other auxiliary devices, which not only saves space but also has a simple structure. This overall structure coordinates stably, which can ensure the accuracy of the transmission of the silicon wafers. The present disclosure also provides a sorting machine equipped with such sorting mechanism.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION

The above and other aspects and features of the present invention will be described more fully hereinafter with reference to the accompanying drawings, in which example embodiments of the present inventions are shown. While some example embodiments of the present invention have been described using specific terms, such description is for illustrative purposes, and it is to be understood that changes and variances may be made without departing from the spirit or scope of the following claims.

Figure 1:
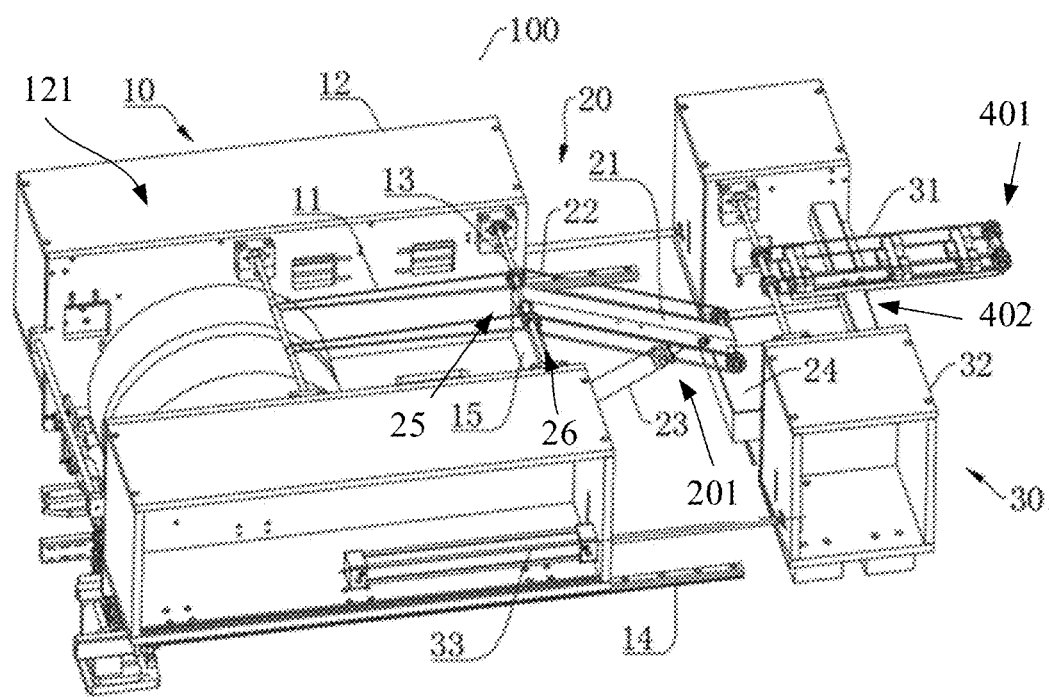
FIG. 1 is a schematic diagram of a structure of a sorting mechanism in a downward tilt state according to an embodiment of the present disclosure.
Figure 2:
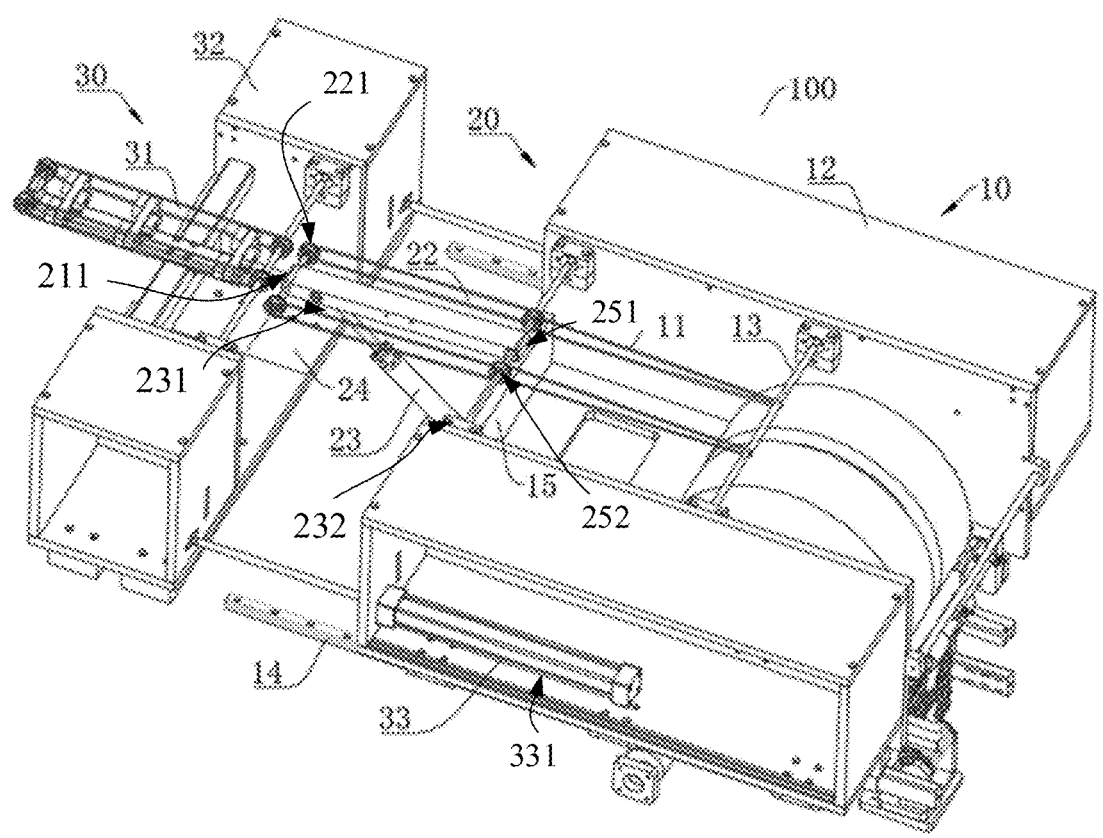
FIG. 2 is a schematic diagram of a structure of a sorting mechanism in a horizontal alignment state according to an embodiment of the present disclosure.

A present embodiment provides a silicon wafer sorting mechanism, as shown in FIGS. 1 and 2, along a transmission direction, the structure is provided with a wafer distribution unit 10, a sorting unit 20, and a transmission unit 30 disposed sequentially. The sorting unit 20 comprises a sorting table 201 with one terminal 25 hinged to the wafer distribution unit 10. The sorting table 201 can be pressed down with the point where it is hinged to the wafer distribution unit 10 and then rotate and tilt downward. The sorting table 201 and the transmission unit 30 are arranged up and down in dislocation, or the sorting table 201 is placed horizontally against the transmission unit 30 and arranged in side-by-side contact, thereby forming two transmission lines 401 and 402 in different directions to sort silicon wafers of different quality types. That is, when abnormal silicon wafers appear, the sorting table 201 is controlled to rotate downward to arrange the abnormal silicon wafers down in the direction of its transmission line 402. When good silicon wafers appear, the sorting table 201 is controlled to placed horizontally, and its terminal away from the wafer distribution unit 10 touches the transmission unit 30 (that is, the sorting unit 20 is in head-to-head contact with the transmission unit 30), thereby a continuous and seamless transmission line 401 to move good-quality silicon wafers forward along the transmission direction. Accordingly, the sorting of silicon wafers of different quality types is completed.

The wafer distribution unit 10 is disposed on one side of the sorting roller. The wafer distribution unit 10 comprises a wafer distribution strip 11 disposed in the transmission direction and wafer distribution frame bodies 12. The wafer distribution frame bodies 12 are structured as a cuboid structure having a cavity 121 and relatively disposed on both sides of the wafer distribution strip 11. The sorting roller is disposed between two wafer distribution frame bodies 12 and away from one terminal of the sorting unit 20. The silicon wafers adsorbed by the sorting wheel are flipped forward and then transmitted along the wafer distribution strip 11. While the silicon wafers are transmitted on the wafer distribution strip 11, camera detectors on both sides of the wafer distribution strip 11 (that is, the camera detectors on two sides of the wafer distribution frame bodies 12) and a visual detector (omitted in the drawings) placed directly above the wafer distribution strip 11 simultaneously inspect the four corners and the surface of each silicon wafer. When a chip, crack or scratch is found on a silicon wafer, the silicon wafer is determined as an abnormal piece; if there is no above problems, the silicon wafer is regarded as a good product.

In the embodiment, all elements of the transmission strip are belt elements. The wafer distribution strip 11 is fixed to the wafer distribution frame bodies by rotation axes 13. One rotation axis 13 is disposed close to the sorting roller, and the other rotation axis 13 is disposed near one side of the sorting unit 20.

A track 14 is arranged below the wafer distribution frame bodies 12 and along the length direction of the wafer distribution frame bodies 12. The wafer distribution frame bodies can slide synchronously along the track 14.

The sorting table 201 in the sorting unit 20 comprises a guide plate 21 and a sorting strips 22 disposed on two sides of the guide plate 21. The same terminals 251/252 of the guide plate 21 and the sorting strip 22 are hinged to the rotation axis 13 that is disposed near one side of the sorting table 201. The other terminal 211 of the guide plate 21 is suspended. The other terminal 221 of the sorting strip 22 is connected to the terminal 211 of the guide plate 21 that is suspended by a short shaft 26 so that the guide plate 21 and the sorting strip 22 form an integral cantilevered sorting table 201 that can rotate forward or reverse with the hinge point where it is hinged to the rotation axis 13.

The sorting unit 20 further comprises an ejector 23 for controlling the rotary swing of the sorting table 201. One terminal 231 of the ejector 23 is hinged to the bottom surface of the terminal of the sorting table 201 that is near the transmission unit 30, and the other terminal 232 thereof is pivoted to a fixed plate 15 placed between the two wafer distribution frame bodies 12. The fixed plate 15 is located directly below the rotation axis 13 hinged to the sorting table 201. In the embodiment, the ejector 23 is a shaft pin type one-way cylinder.

A collection slot 24 for collecting abnormal silicon wafers is disposed below the transmission unit 30, that is, between adjacent transmission frame bodies 32 of the transmission unit 30. A portion of the collection slot 34 is located directly below the transmission strip 31 of the transmission unit 30. In order to ensure that the abnormal silicon wafers can be completely stored in the collection slot 24, since the length of the sorting table 201 is constant and its horizontal distance is shortened when it tilts downward, a portion of the collecting slot 24 has be arranged directly below the suspended terminal of the sorting table 201 in a tilted state, and then other portions of the collecting slot 24 have to located directly below the transmission strip 31.

The transmission unit 30 comprises transmission frame bodies 32 that are disposed fixedly and a transmission strip 31 for transmitting the good silicon wafers. The transmission strip 31 and the wafer distribution strip 11 are configured at the same height. The transmission frame bodies 32 are disposed on two sides of the transmission strip 31 and coaxially arranged with the wafer distribution frame bodies 12 that are disposed oppositely. The transmission frame bodies 32 are constructed as a housing structure, and the length of the transmission frame bodies 32 may be set based on the characteristics of the transmission unit 30, however, the present disclosure is not limited thereto. This structure is provided to facilitate the arrangement of the wafer distribution unit 10 and the transmission unit 30 and further to save installation space. Moreover, the wafer distribution unit 10 can be controlled synchronously and precisely to move along the track 14.

The transmission unit 30 further comprises adjustable components 33 for adjusting the horizontal distance between the transmission strip 31 and the wafer distribution strip 11. The adjustable components 33 are fixed one-way cylinder, and each transmission frame body 32 is equipped with one adjustable component 33. One terminal of the piston 331 of the adjustable component 33 is fixed in the housing of the transmission frame body 32. The other terminal of the piston 331 is fixed in a cylinder placed in the inner cavity 121 of the wafer distribution frame body 12. Due to the limited length of the sorting mechanism 100, when the cantilevered sorting table 201 rotates, the sorting table 201 is controlled by the ejector 23 to rotate forward or reverse. If the wafer distribution unit 10 is directly fixed, the horizontal distance between the wafer distribution unit 10 and the transmission unit 30 is constant. In order to ensure the degree of freedom of the rotation of the sorting table 201, it is necessary to cause the horizontal distance between the wafer distribution unit 10 and the transmission unit 30 greater than the rotation radius of the sorting table 201, so as to ensure that the sorting table 201 can rotation freely, which, however, will lead to a gap in the contact between the sorting table 201 and the transmission strip 31, thereby affecting the smooth delivery of silicon wafers. The adjustable component 33 is provided so that when the sorting table 201 rotates in the forward direction, the adjustable component 33 synchronously drives the wafer distribution frame bodies 12 to retreat away from the transmission unit 30 along the length direction of the track 14, so as to expand the distance between the wafer distribution strip 11 and the transmission strip 31 to be sufficient to be rotated and moved by the sorting table 201. When the sorting table 201 retreats in the opposite direction, the adjustable component 33 synchronously drives the wafer distribution frame bodies 12 to move toward the transmission unit 30 along the length direction of the track 14, so as to shorten the distance between the wafer distribution strip 11 and the transmission strip 31. Accordingly, the suspended terminal of the sorting table 201 can be in close contact with the transmission strip 31, so that the sorting strip 22 and the transmission strip 31 are seamlessly connected to form a horizontal transmission line 401, thereby ensuring that the good silicon wafers can move forward stably.

During the operation, the ejector 23 shrinks the piston or elongate piston to drive the sorting table 201 to rotate forward or reverse with the hinge point where the sorting table 201 is hinged to the rotating shaft 13 as the center of the circle. When there are abnormal silicon wafers, the sorting table 201 is pulled down by controlling the ejector 23 to shrink the piston so that the sorting table 201 rotates in the forward direction. When piston is shrunk to the minimum position, the suspended terminal of the sorting table 201 is just located on the collection slot 24. Accordingly, the abnormal silicon wafers are tilted down the surface of the sorting table 201 when the sorting table 201 rotates downward in the forward direction. Then, the abnormal silicon wafers are discharged and moved to the collection slot 24 disposed in the transmission unit 30, as shown in FIG. 1. When the abnormal silicon wafers are discharged, the sorting table 201 then rotates reverse with the hinge point where the sorting table 201 is hinged to the rotating shaft 13 and is in contact with the terminal of the transmission unit 30 so that the sorting unit 20 and the transmission unit 30 form a horizontal transmission line 401. Accordingly, the good silicon wafers transmitted from the wafer distribution unit 10 move forward along the horizontal transmission line 401, and then, the good silicon wafers are transmitted to the next process.

A silicon wafer cleaning machine employs a sorting mechanism 100 as described above.

The silicon wafer sorting mechanism of the present disclosure only adopts a cantilevered sorting table 201 to form two transmission lines 401 and 402, which tilt downward and are disposed, in different directions on the original space length. When the sorting table 201 rotates downward, abnormal silicon wafers can be smoothly sent into the storage slot. When the sorting table 201 rotates counterclockwise, the front wafer distribution unit that disposed to drive the sliding action is seamlessly connected to the rear transfer unit, which continuously provides a smooth transmission line 401 for the good silicon wafers. The whole matching mechanism can quickly and accurately sort good and defective products and makes the defective products go down for collection without setting up other auxiliary devices, which not only saves space but also has a simple structure. This overall structure coordinates stably, which can ensure the accuracy of the transmission of the silicon wafers. The present disclosure also provides a sorting machine equipped with such sorting mechanism.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A silicon wafer sorting mechanism, comprising:
a wafer distribution unit;
a sorting unit, comprising a sorting table with one terminal hinged to the wafer distribution unit, wherein the sorting table rotates and tilts with a point where the sorting table is hinged to the wafer distribution unit; and
a transmission unit, disposed sequentially;
wherein the sorting table and the transmission unit are arranged up and down in dislocation or the sorting table is placed horizontally against the transmission unit, thereby forming two transmission lines in different directions to sort silicon wafers of different types;
wherein the wafer distribution unit comprises:
a wafer distribution strip, disposed in a transmission direction; and
wafer distribution frame bodies, structured as a cuboid structure having a cavity and relatively disposed on two sides of the wafer distribution strip,
wherein the wafer distribution strip is fixed to the wafer distribution frame bodies by rotation axes;
wherein a track arranged below the wafer distribution frame bodies and along a length direction of the wafer distribution frame bodies, and the wafer distribution frame bodies slide synchronously along the track.

2. The silicon wafer sorting mechanism as claimed in claim 1, wherein the sorting unit further comprises an ejector for controlling rotary swing of the sorting table, one terminal of the ejector is hinged to a bottom surface of a terminal of the sorting table that is adjacent to the transmission unit, and the other terminal of the ejector is pivoted to an inside of the wafer distribution unit, wherein the ejector is shrunk or elongated to drive the sorting table rotate downward or reverse to a horizontal position with the point where the sorting table is hinged to the wafer distribution unit as a center of a circle.

3. The silicon wafer sorting mechanism as claimed in claim 1, wherein the sorting table comprises:
a guide plate; and a sorting strip disposed on two sides of the guide plate,
wherein terminals of the guide plate and the sorting strip are hinged to one of the rotation axes that is disposed adjacent to one side of the sorting table; the other terminal of the guide plate is suspended; the other terminal of the sorting strip is connected to the terminal of the guide plate that is suspended by a short shaft.

4. The silicon wafer sorting mechanism as claimed in claim 1, wherein the transmission unit comprises transmission frame bodies that are disposed fixedly and a transmission strip for transmitting good silicon wafers; the transmission strip and the wafer distribution strip are configured at a same height; the transmission frame bodies are disposed on two sides of the transmission strip and coaxially arranged with the wafer distribution frame bodies that are disposed oppositely.

5. The silicon wafer sorting mechanism as claimed in claim 4, wherein the transmission frame bodies are constructed as a housing structure.

6. The silicon wafer sorting mechanism as claimed in claim 5, wherein the transmission unit further comprises adjustable components for adjusting a horizontal distance between the transmission strip and the wafer distribution strip, and each of the transmission frame bodies is equipped with one adjustable component, wherein two terminals of a piston of each of the adjustable components are respectively disposed on each of the wafer distribution frame bodies and each of the transmission frame bodies that are on a same side.

7. The silicon wafer sorting mechanism as claimed in claim 5, wherein a collection slot for collecting silicon wafers is disposed, and a portion of the collection slot is located directly below the transmission strip.

8. A silicon wafer cleaning machine, comprising a silicon wafer sorting mechanism, the silicon wafer sorting mechanism comprising:
a wafer distribution unit;
a sorting unit, comprising a sorting table with one terminal hinged to the wafer distribution unit, wherein the sorting table rotates and tilts with a point where the sorting table is hinged to the wafer distribution unit; and
a transmission unit, disposed sequentially;
wherein the sorting table and the transmission unit are arranged up and down in dislocation or the sorting table is placed horizontally against the transmission unit, thereby forming two transmission lines in different directions to sort silicon wafers of different types;
wherein the wafer distribution unit comprises:
a wafer distribution strip, disposed in a transmission direction; and
wafer distribution frame bodies, structured as a cuboid structure having a cavity and relatively disposed on two sides of the wafer distribution strip,
wherein the wafer distribution strip is fixed to the wafer distribution frame bodies by rotation axes;
wherein a track arranged below the wafer distribution frame bodies and along a length direction of the wafer distribution frame bodies, and the wafer distribution frame bodies slide synchronously along the track.

9. The silicon wafer cleaning machine as claimed in claim 8 wherein the sorting unit further comprises an ejector for controlling rotary swing of the sorting table, one terminal of the ejector is hinged to a bottom surface of a terminal of the sorting table that is adjacent to the transmission unit, and the other terminal of the ejector is pivoted to an inside of the wafer distribution unit, wherein the ejector is shrunk or elongated to drive the sorting table rotate downward or reverse to a horizontal position with the point where the sorting table is hinged to the wafer distribution unit as a center of a circle.

10. The silicon wafer cleaning machine as claimed in claim 8, wherein the sorting table comprises:
a guide plate; and
a sorting strip disposed on two sides of the guide plate,
wherein terminals of the guide plate and the sorting strip are hinged to one of the rotation axes that is disposed adjacent to one side of the sorting table; the other terminal of the guide plate is suspended; the other terminal of the sorting strip is connected to the terminal of the guide plate that is suspended by a short shaft.

11. The silicon wafer cleaning machine as claimed in claim 8, wherein the transmission unit comprises transmission frame bodies that are disposed fixedly and a transmission strip for transmitting good silicon wafers; the transmission strip and the wafer distribution strip are configured at a same height; the transmission frame bodies are disposed on two sides of the transmission strip and coaxially arranged with the wafer distribution frame bodies that are disposed oppositely.

12. The silicon wafer cleaning machine as claimed in claim 11, wherein the transmission frame bodies are constructed as a housing structure.

13. The silicon wafer cleaning machine as claimed in claim 12, wherein the transmission unit further comprises adjustable components for adjusting a horizontal distance between the transmission strip and the wafer distribution strip, and each of the transmission frame bodies is equipped with one adjustable component, wherein two terminals of a piston of each of the adjustable component are respectively disposed on each of the wafer distribution frame bodies and each of transmission frame bodies that are on a same side.

14. The silicon wafer cleaning machine as claimed in claim 12, wherein a collection slot for collecting silicon wafers is disposed, and a portion of the collection slot is located directly below the transmission strip.

* * * * *